United States Patent [19]

Jaus

[11] Patent Number: 4,915,436

[45] Date of Patent: Apr. 10, 1990

[54] WHEEL SET FOR RAIL VEHICLES

[76] Inventor: Rudolf Jaus, Gruneggstr. 12, 6005 Luzern, Switzerland

[21] Appl. No.: 181,192

[22] Filed: Apr. 13, 1988

[30] Foreign Application Priority Data

Apr. 13, 1987 [CH] Switzerland ............... 1420/87

[51] Int. Cl.4 .................................. B60B 35/00
[52] U.S. Cl. ..................... 295/36.1; 301/124 R; 105/1.1
[58] Field of Search ............. 295/30, 36.1, 38, 39, 295/43, 25; 301/124 R, 126, 105 R; 105/1.1

[56] References Cited

U.S. PATENT DOCUMENTS

| 7,611 | 6/1833 | Baldwin | 295/25 |
|---|---|---|---|
| 24,315 | 6/1859 | Lambaert | 295/36.1 |
| 26,425 | 12/1859 | Foster | 295/36.1 |
| 87,687 | 3/1869 | Ligon | 295/36.1 |
| 200,884 | 3/1878 | Whiting | 295/36.1 |
| 243,007 | 6/1881 | Timby | 295/36.1 |
| 390,811 | 10/1888 | Smith | 295/36.1 |
| 1,594,149 | 7/1926 | Buckwalter | 295/38 |
| 2,001,167 | 5/1935 | Swennes | 295/36.1 X |
| 2,512,186 | 6/1950 | Urschel | 295/36.1 |
| 3,756,646 | 9/1973 | Gimlett et al. | 295/43 |

FOREIGN PATENT DOCUMENTS 2614166 10/1977 Fed. Rep. of Germany .
2950565 6/1981 Fed. Rep. of Germany .
3538779 8/1986 Fed. Rep. of Germany .

Primary Examiner—Margaret A. Focarino
Assistant Examiner—Frank H. Williams, Jr.
Attorney, Agent, or Firm—Ostrolenk, Faber, Gerb & Soffen

[57] ABSTRACT

The present invention concerns a wheel set for rail vehicles, consisting of an axle 2 and at least two wheels 4, the axle 2 being tubular. Each of the wheels 4 can be arranged on a support tube 3, each support tube 3 being postioned, pushed from one end of the tubular axle 2, over the latter in such a manner that the wheel spacing corresponds to a standard wheel gauge. For better aerodynamics of the wheel set, the two support tubes 3 can furthermore be covered by a sleeve 7, such sleeve 7 being preferably made of plastic or light metal.

11 Claims, 2 Drawing Sheets

WHEEL SET FOR RAIL VEHICLES

The present invention relates to a wheel set for rail vehicles, consisting of an axle and at least two wheels.

Wheel sets, comprising a wheel arranged at each end and a wheel axle, today normally consist entirely of cast steel. Furthermore, all parts are cast solid, i.e. there are no hollow parts on traditional wheel axles.

As a result of the solid-cast construction, wheel sets are heavy, due to which, on the one hand, the rolling friction of the wheels is high and, on the other hand, the mass to be accelerated or braked is substantial.

The percentage by weight represented by trucks, of which the wheel set constitutes at least 50% of the weight, represents a total percentage of 30% to 40% of the weight in modern passenger cars or locomotives; savings in weight on wheel sets therefore have a substantial effect on savings in weight in the entire rail vehicle.

Another problem exists in the wheel sets used today, namely that as a result of the relatively small cross section of the wheel axle as compared with the diameter of the wheel, there is the possibility of air being drawn-in, in the longitudinal direction below the rail vehicle perpendicular to the axis, and thus of turbulences in the region of the wheel set, which leads to very unpleasant travel noises.

The object of the present invention is to develop a wheel set which is lighter and operates in a more favorable aerodynamic manner.

In accordance with the invention, this is achieved with a wheel set according to at least one of the claims, such as claim 1.

In accordance with the invention, the wheel axle which is mounted and rotates in the wheel hubs is a steel or cast-iron tube. In this way, a larger cross section of the wheel axle is obtained, on the one hand, while, on the other hand, weight is saved.

In a preferred embodiment of the invention, the wheels are not mounted directly on this steel cast-iron tube but each of them is mounted on a support tube which is pushed from both sides over the axle tube in such a manner that the two wheels assume a wheel spacing which corresponds to a standard wheel gauge. The length of the support tubes is so selected that they at most contact each other at the center of the wheel axle in their final position when the desired wheel spacing is obtained.

The support tubes are preferably securely fastened to the tubular axle, this being effected either by welding or by pinning.

In another preferred embodiment of the invention, the support tubes are covered by sleeves. These sleeves extend at least partially within the region of the middle of the axle cylindrically around the support tubes and flare out conically towards the wheels. Each sleeve is fastened on one end to the wheel rim and on the other end to a separate metal ring which is arranged fixed in the middle of the axle over a support tube. The sleeves need not necessarily lie on the support tube but their diameter can be so selected, depending on the aerodynamic requirements, that a hollow space is produced, at least in part, between the sleeve and the support tube. A hollow space is produced at least in the region of the wheel rim where the sleeve flares out conically.

The base generatrix of the conical sleeve which extends on a wheel rim can preferably be so developed that it consists of a protruding circular ring which can be bonded, welded or screwed onto the wheel rim. The outer edge of this ring or collar must never extend beyond the wheel rim.

The sleeve may preferably either consist of plastic, such as a fiber-reinforced reaction resin, or, in accordance with the rotary principle, from a monomer-cast thermoplastic such as, for instance, polyamide, or else from a light metal such as aluminum or an alloy thereof.

Particularly in the event that the cylindrical portion of the sleeve does not lie fully on the support tube but a hollow space is produced between them as a result of a substantially larger diameter than the support tube, the strength of the sleeve is greatly reduced. For this reason, in a preferred arrangement of the invention it is provided that at least four wires for reinforcement and stabilization are provided through the sleeve, these wires, extending through the rail wheel and being fastened at one end and extending at the other end out of the sleeve through the two metal rings which lie in the middle of the axle, at least partially into the facing other sleeve. For this reason, in this preferred embodiment it must be seen to it already before the mounting of the sleeves that corresponding introduction depressions are provided in the ends of the sleeves which face the middle of the wheel axle. The ends of the wires passing through the two metal rings from the facing sleeve are then, upon the pushing together of the support tubes with the sleeves lying above them, pushed into said depression upon the mounting of the wheels.

These reinforcement wires preferably consist of metal rods such as used, for instance, in reinforced concrete constructions.

By these reinforcing wires the two sleeve constructions are so braced with respect to each other in the middle of the wheel axle that a compact construction which is no longer relatively turnable is produced. This compact manner of construction makes it possible for a metal cuff to be arranged in the middle of the wheel axle over the metal rings and in part over the sleeves, which metal cuff, provided, for instance, with a gear wheel, can be used for the operating of a source of energy, such as a generator.

Particularly in the field of short-haul transportation, where sharp curves are frequently responsible for the screeching of wheel sets as a result of slippage, a differential can also be provided in the middle of the wheel axle in the arrangement according to the invention. In this case, the structure must be interrupted in the middle of the wheel axle in such a manner that the wheels are not completely rigid with respect to each other in the horizontal plane.

The wheels used for the embodiment of the wheel set which has been described in accordance with the invention can be either traditional solid-cast wheels or so-called monoblock wheels, as well as spoked wheels. In the case of spoked wheels they must have at least four spokes and the strength of the wheel set must be assured. Spoked wheels have the advantage that, on the one hand, the weight of the wheel can be reduced and, on the other hand, disc brakes lying on the inside on the wheel rim can be cooled by entrance and emergence of air.

The wheel set of the invention will now be described with reference to an example shown in the drawing, in which:

FIG. 1 shows one half of a wheel set according to the invention, seen in perspective.

Figure 1:
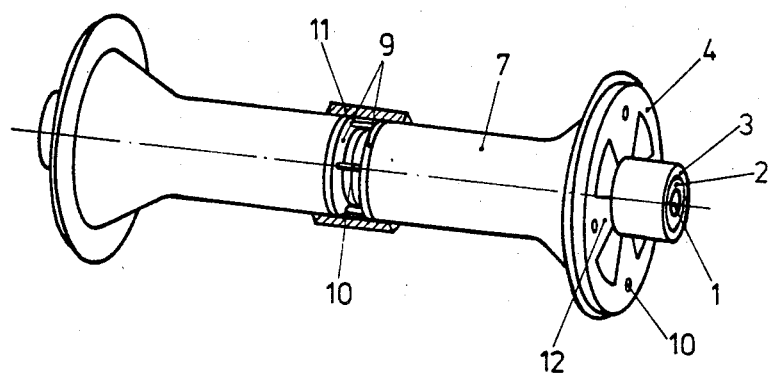
FIG. 1 is a perspective view of a wheel set in accordance with the invention.

The wheel set consists first of all of a tubular axle 2 which has a hollow space 1 within it.

Over the tubular axle there is shoved a support tube 3 which extends in its lengthwise direction from the outer end of the tubular axle 2 up to at most the middle of the axle. On the support tube 3 there is arranged the rail wheel 4 together with the tread 5 and the wheel rim 6.

Over the support tube 3 there is furthermore arranged a sleeve 7, preferably made of plastic or light metal, which extends cylindrically parallel to the support tube within the region of the middle of the axle and flares out conically towards the wheel rim. In this connection a hollow space 8 is produced, at least in the region of the conical shape of the sleeve. The sleeve 7 is fastened at one end to the wheel rim 6 and on the other end to a metal ring 9 which is arranged over the support tube 3 at the middle of the axle.

Extending through the sleeve 7 there are reinforcement wires 10 which on the one end are fastened extending completely through the wheel 4 and on the other end, passing through the two metal rings 9 lying in the middle of the wheel axle, extend in part into the facing sleeve.

Over the two metal rings 9 and the sleeve 7 there is arranged, at the midpoint of the wheel axle, a metal cuff 11 on which there can be arranged, for instance, a gear wheel for the operating of a generator.

Figure 2:
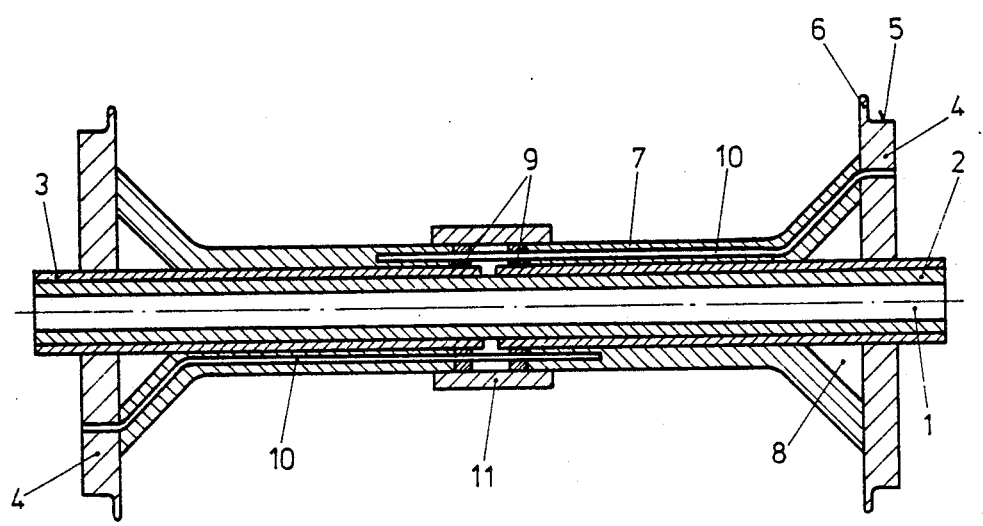
FIG. 2 is a longitudinal cross section through a wheel set according to the invention.

In FIG. 2, the same wheel set of the invention is shown in a cross section lengthwise to the wheel axle.

Upon the construction of a wheel set one starts from a tubular axle 2. The support tubes 3 are then pushed over it from both sides, the tubes having been provided at least with the two rail wheels 4. Upon the pushing on of the support tubes, the rail wheels 4 are brought into a distance apart which corresponds to a standard wheel gauge.

For the better cooling of the disc brakes (not shown), which are arranged on the inside of the wheel rim 6, a spoked wheel with spokes 12 is provided in FIG. 1.

The mounting of a sleeve 7 is preferably effected before the mounting of the support tubes over the tubular axle.

If plastic sleeves 7 are used, they can be made either by the lamination method or else by casting in the form of fiber-reinforced reaction resins. In the event of casting, the manner of pressure casting customary today can be used. As reinforcement, glass fiber or carbon fiber fabrics can be employed.

Another possibility for the manufacture of the plastic sleeves 7 is that they are produced by the rotary process from thermoplastic resins. In particular the monomer casting process is known for the production of polyamide structural parts.

However, the sleeves can also be made of light, metal such as aluminum or alloys thereof.

The sleeve 7, which is pushed over the support tube is fastened on it one end to the wheel rim 6. For this purpose the sleeve 7 is selected in such a manner that at the wheel rim 6 it has a collar which rests against the wheel rim 6. This circular collar can now be bolted or bonded onto the wheel rim 6 in the case of the rail wheel 4. The other end of the sleeve 7 is also bolted or bonded to the metal ring 9 so that the sleeve 7 is in fixed position with respect to the support tube 3.

The structural development of the sleeve 7 depends to a great extent on the speed with which the rail vehicle is to travel, as well as on the surrounding construction in the region of a truck. The purpose of the conical development in the region of the rail wheel 4 is to assure a flow of air against the middle point of the axle so that no turbulence results in the vicinity of the rail wheel 4. It is, in particular, turbulences in the region of the rail wheel 4 which are responsible for travel-wind noises.

In the event that the sleeve 7 does not rest at any place on the support tube 3, for instance in order to obtain the greatest possible volume diameter, reinforcement wires 10 such as, for instance, iron bars, are preferably provided in order to increase the strength of the sleeve 7. These reinforcement wires 10 extend on the one end, for fastening, through the rail wheel 4 and, on the other end, through the two metal rings 9 into the facing sleeve 7 in order thereby to produce a compact construction in the middle region of the axle.

If the support tubes 3 are pushed over the tubular axle 2 only after the sleeve construction has been mounted, it must be seen to it that the metal rings 9 as well as the sleeves 7 have recesses to receive the ends of the reinforcement wires 10 which emerge from the other sleeves and the metal ring.

If the support tubes 3 together with the sleeves 7 are now pushed over the tubular axle 2 then the support tube 3 is firmly secured to the tubular axle, for instance by pinning, so that relative rotation is impossible.

In the construction obtained in this way it is furthermore possible, as shown in FIGS. 1 and 2, to apply a tubular cuff 11 over the metal rings 9 in the region of the middle of the axle. This is desirable in particular when, for example, a gear wheel which can be used for driving a source of energy is arranged on the tubular cuff 11.

Figure 3:
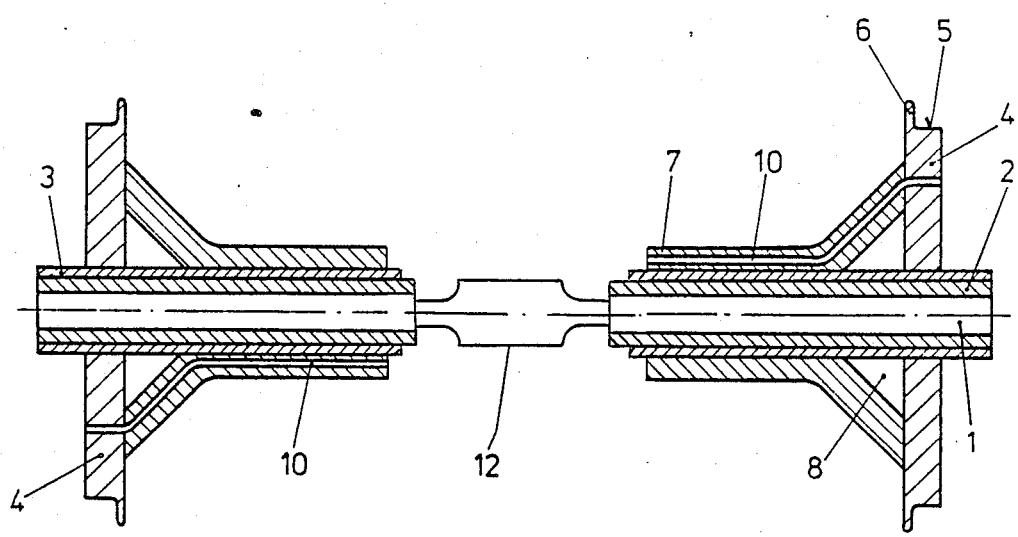
FIG. 3 is a fragmentary view showing an alternate embodiment with a differential.

In FIGS. 1 and 2, the axle 2 is shown as uninterrupted in its middle. In the alternate embodiment of FIG. 3, the axle 2 is interrupted in its middle and a conventional differential 12 is placed there. The support tubes 3 are pushed over the opposite ends of the two sections of the tubular axle and are inside the sleeves 7. No ring 9 need be provided, as it is not the purpose of this embodiment to hold each of the sleeves 7 in fixed position with respect to each other. However, the sleeves are in fixed position with respect to the support tube 3. Similarly, reinforcement wires would not be provided in any way that interferes with the relative rotations of the axle sections around the differential 12.

The wheel set shown in FIGS. 1 and 2 can preferably be used for freight or passenger cars. In this connection it is immaterial whether they are two-axle, four-axle or multi-axle cars. In the case of locomotives, the wheel set construction shown can be used, in particular, in the case of so-called idle wheels.

The wheel set of the invention can be used not only exclusively in the field of railway rail vehicles but also for any rail vehicles in other sectors.

I claim:

1. A wheel set for rail vehicles, the wheel set comprising:
    an axle for supporting two wheels spaced apart, the axle having opposite ends and respective end regions inward from the opposite ends;
    a respective support tube for a wheel disposed around each of the end regions of the axle; a respective wheel arranged on each support tube at the respective end region of the axle, the wheel extending around the support tube and the support tube extending through the wheel, whereby the wheel is supported to the support tube; the support tubes being so placed on the axle as to space the wheels apart a distance corresponding to a preset wheel gauge;

a respective sleeve disposed around the outside of each support tube, axially inward of each of the wheels, and engaging and extending axially inward from the inner side of the wheel toward the middle of the axle, in the region of the sleeve axially approaching the inner side of the wheel, the sleeve flaring outwardly and defining a conical shape at and axially inward from the inner side of the wheel such that a space is formed between the conical shape, the wheel, and the support tube, the conical shape being selected for reducing air turbulence in the region of the wheel.

2. A wheel set as in claim 1, wherein the support tubes are rigidly connected to the axle.

3. A wheel set as in claim 1, wherein the sleeve is a plastic sleeve comprising fiber-reinforced reaction resin.

4. A wheel set as in claim 1, wherein the sleeve consists essentially of a thermoplastic resin.

5. A wheel set as in claim 1, wherein the sleeve consists essentially of a material selected from the group consisting of light metals and alloys of light metals.

6. A wheel set as in claim 5, wherein the light metal is aluminum.

7. A wheel set as in claim 1, wherein wireshaped reinforcements are arranged through the sleeve.

8. A wheel set as in claim 7, wherein said wire-shaped reinforcements are iron bars.

9. A wheel set as in claim 1, wherein a differential is arranged in the middle of the axle.

10. A wheel set as in claim 1, wherein each wheel is a spoked wheel having at least four spokes.

11. A wheel set as claimed in claim 1, wherein the axle is hollow.

* * * * *